United States Patent
Mun et al.

(10) Patent No.: US 7,209,204 B2
(45) Date of Patent: Apr. 24, 2007

(54) LIQUID CRYSTAL DISPLAY HAVING WIDE VIEWING ANGLE

(75) Inventors: Joong-Hyun Mun, Suwon (KR); Jang-Kun Song, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 09/970,994

(22) Filed: Oct. 5, 2001

(65) Prior Publication Data

US 2002/0093615 A1 Jul. 18, 2002

(30) Foreign Application Priority Data

Jan. 12, 2001 (KR) ................... 2001-1791

(51) Int. Cl.
*G02F 1/1343* (2006.01)
(52) U.S. Cl. ....................... 349/139; 349/143
(58) Field of Classification Search ............... 349/129, 349/139, 143
See application file for complete search history.

(56) References Cited

U.S. PATENT DOCUMENTS

| 6,473,142 B2 | 10/2002 | Kim et al. ............. 349/84 |
| 6,473,149 B2 * | 10/2002 | Melnik et al. .......... 349/155 |
| 6,567,144 B1 * | 5/2003 | Kim et al. ............. 349/128 |
| 6,573,965 B1 * | 6/2003 | Liu et al. .............. 349/129 |
| 2002/0033927 A1 * | 3/2002 | Mun et al. ............. 349/156 |
| 2004/0046915 A1 * | 3/2004 | Takeda et al. .......... 349/129 |

FOREIGN PATENT DOCUMENTS

EP 1091238 A2 * 4/2001

OTHER PUBLICATIONS

Merriam Webster's Collegiate Dictionary, 10th Ed. pp. 335 and 600.*

* cited by examiner

Primary Examiner—Dung T. Nguyen
(74) Attorney, Agent, or Firm—MacPherson Kwok Chen & Heid LLP

(57) ABSTRACT

Disclosed is a liquid crystal display comprising a first substrate; pixel electrodes formed on the first substrate, the pixel electrodes having formed thereon a first aperture pattern; a second substrate provided opposing the first substrate; a common electrode formed on the second substrate, the common electrode having formed thereon a second aperture pattern; liquid crystal material injected between the first and second substrates; and spacers provided between the first and second substrates for maintaining a predetermined gap between the first and second substrates, wherein center portions of the first aperture pattern and the second aperture pattern are substantially straight and formed alternatingly in parallel, and wherein the spacers are positioned at ends of the second aperture pattern.

7 Claims, 3 Drawing Sheets

LIQUID CRYSTAL DISPLAY HAVING WIDE VIEWING ANGLE

BACKGROUND OF THE INVENTION (a) Field of the Invention

The present invention relates to a liquid crystal display having a wide viewing angle, and more particularly, to a liquid crystal display in which a predetermined pattern is formed on common electrodes and pixel electrodes to obtain a wide viewing angle.

(b) Description of the Related Art

A liquid crystal display (LCD) is structured having liquid crystal material injected between an upper substrate, on which common electrodes and a color filter are formed, and a lower substrate, on which thin film transistors and pixel electrodes are formed. Voltages of different potentials are applied to the pixel electrodes and common electrodes to form an electric field, thereby varying the alignment of liquid crystal molecules of the liquid crystal material. In this way, the transmittance of incident light is controlled to enable the display of images.

In a vertically aligned (VA) LCD, long axes of the liquid crystal molecules align themselves vertically to the substrates in a state where no electric field is formed between the substrates. Accordingly, using polarizing plates, light is completely blocked when there is no electric field. That is, in a normally black mode, since brightness of an off state is extremely low, a higher contrast ratio than obtained in a twisted nematic LCD is realized.

When an electric field is formed, however, since the slanting direction of the liquid crystal molecules is irregular, there exist areas where a polarizing direction of polarizing plates of the upper and lower substrates corresponds to the direction of the long axes of the liquid crystal molecules. In these areas, the liquid crystal molecules cannot rotate the polarizing direction of light such that the light is cut off by the polarizing plates. This results in dark areas on the screen, which is referred to as texture. Accordingly, it becomes necessary to pattern the electrodes.

Further, permanent damage to brightness may occur in the vertically aligned LCD if the display receives outside shock. That is, outside shock to the LCD may significantly alter a thickness of a liquid crystal cell is significantly altered as a result of the elastic properties of spacers used to maintain a cell gap between the substrates. Hence, the screen becomes spotted.

SUMMARY OF THE INVENTION

The present invention has been made in an effort to solve the above problems.

It is an object of the present invention to provide a liquid crystal display having a wide viewing angle, which improves picture quality and reduces brightness variations.

To achieve the above object, the present invention provides a liquid crystal display comprising a first substrate, pixel electrodes formed on the first substrate, and having a first aperture pattern, a second substrate provided opposing the first substrate, a common electrode formed on the second substrate having a second aperture pattern, liquid crystal material injected between the first and second substrates, and spacers provided between the first and second substrates for maintaining a predetermined gap between the first and second substrates, wherein center portions of the first aperture pattern and the second aperture pattern are substantially straight and formed alternatingly in parallel, and wherein the spacers are positioned at ends of the second aperture pattern.

According to a feature of the present invention, the first aperture pattern includes a first aperture formed in a first direction in an upper region of the pixel electrodes, and a second aperture formed in a lower region of the pixel electrodes in a second direction, which forms a right angle with the first direction, and the second aperture pattern includes a first base aperture formed in the first direction at a position corresponding to the upper region of the pixel electrodes, and a second base aperture formed in the second direction at a position corresponding to the lower region of the pixel electrodes.

According to another feature of the present invention, the first direction forms an oblique angle with edges of the pixel electrodes.

According to yet another feature of the present invention, the second aperture pattern includes a first branch aperture that overlaps upper and lower edges of the pixel electrodes, and a second branch aperture that overlaps left and right edges of the pixel electrodes the first aperture pattern includes third apertures positioned at upper and lower center portions of the pixel electrodes uniformly provided with respect to the upper and lower edges of the pixel electrodes and the first and second aperture patterns divide the pixel electrodes into a plurality of closed polygonal shapes.

According to still yet another feature of the present invention, the second branch aperture than the base apertures.

According to still yet another feature of the present invention, the first direction is formed uniformly with one edge of the pixel electrodes.

In another aspect, the present invention provides a liquid crystal display comprising a first substrate pixel electrodes formed on the first substrate having a first aperture pattern, a second substrate provided opposing the first substrate, a common electrode formed on the second substrate formed thereon a second aperture pattern, liquid crystal material injected between the first and second substrates, and spacers provided between the first and second substrates for maintaining a predetermined gap between the first and second substrates, wherein the first aperture pattern includes a first aperture formed horizontally from a first side of the pixel electrodes, and second and third apertures formed obliquely from the first aperture and symmetrically about the first aperture, and formed such that an interval between the second and third apertures decreases as a second side of the pixel electrodes, which is opposite the first side, is approached, wherein the second aperture pattern includes (a) a base portion formed horizontally, (b) a fourth aperture having first and second branches formed obliquely from the base portion such that a distance between the first and second branches increases in a direction away from the base portion, and having first and second branch ends formed vertically in opposite directions from distal ends respectively of the first and second branches, (c) a fifth aperture having a first center portion formed substantially in parallel with the first branch, and having first and second bends forming horizontal and vertical portions, and (d) a sixth aperture formed symmetrically with the fifth aperture about the fourth aperture, wherein the first and second aperture patterns are formed alternatingly when the liquid crystal display is viewed from above, and wherein the spacers are provided at ends of the second aperture pattern.

In yet another aspect, the present invention provides a liquid crystal display comprising a first substrate, pixel electrodes formed on the first substrate having a first aperture pattern, a second substrate provided opposing the first substrate, a common electrode formed on the second substrate having a second aperture pattern, and liquid crystal material injected between the first and second substrates, wherein the first aperture pattern includes first apertures dividing an upper portion of the pixel electrodes into vertical regions, and second apertures formed below the first apertures to divide a lower portion of the pixel electrodes into horizontal regions, wherein the second aperture pattern includes third apertures formed vertically, and fourth apertures formed horizontally below the third apertures, and wherein the first apertures and the third apertures are alternatingly formed to divide the upper portion of the pixel electrodes into a plurality of regions, and the second apertures and fourth apertures are alternatingly formed to divide the lower portion of the pixel electrodes into a plurality of regions.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
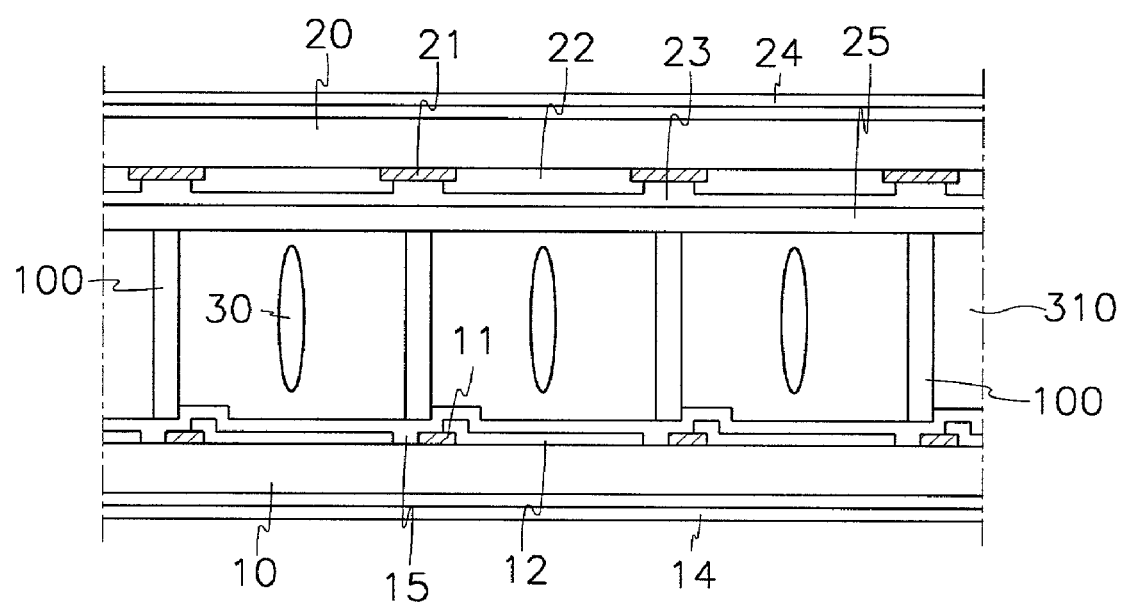
FIG. 1 is a schematic sectional view of a portion of a liquid crystal display according to a preferred embodiment of the present invention.

FIG. 1 shows a schematic sectional view of a portion of a liquid crystal display according to a preferred embodiment of the present invention.

The liquid crystal display includes a first (lower) substrate 10 and a second (upper) substrate 20, which are provided substantially in parallel with a predetermined gap therebetween, a liquid crystal layer 310 formed of liquid crystal material between the substrates 10 and 20, and comprised of liquid crystal molecules 30 that are aligned perpendicular to the substrates 10 and 20, and spacers 100 provided between the substrates 10 and 20, the spacers 100 maintaining a predetermined gap between the substrates 10 and 20.

Pixel electrodes 12 are formed on the first substrate 10, the first substrate 10 being made of a transparent insulating material. The pixel electrodes 12 are made of a transparent conducting material such as ITO (indium tin oxide) or IZO (indium zinc oxide), and have an aperture pattern (not shown) formed thereon. Each pixel electrode 12 is connected to a switching element 11 to receive an image signal voltage. A thin film transistor is generally used for the switching elements 11. Each thin film transistor is connected to a gate line (not shown), which transmits scanning signals, and to a data line (not shown), which transmits image signals. The thin film transistors turn the pixel electrodes 12 on and off according to the scanning signals. Further, an orientation layer 15 for orienting the liquid crystal molecules 30 is also formed on the first substrate 10. Finally, a lower polarizing plate 14 is provided on an outer surface of the first substrate 10. In a reflective-type LCD, it is not necessary that the pixel electrodes 12 be made of a transparent material, nor is it necessary to attach the lower polarizing plate 14 to the first substrate 10.

Formed on the second substrate 20, which is made of a transparent insulating material like the first substrate 10, are a black matrix 21 for preventing light leakage; a red, green, blue color filter 22; a common electrode 23 made of a transparent conducting material such as ITO and IZO, and having an aperture pattern (not shown) formed thereon; and an orientation layer 25 for orienting the liquid crystal molecules of the liquid crystal layer 310. It is possible for the black matrix 21 or the color filter 22 to be formed on the first substrate. There is also provided an upper polarizing plate 24 on an outer surface of the second substrate 20.

The lower and upper polarizing plates 14 and 24 are arranged such that their polarizing directions are perpendicular to each other in the normally black mode, and in the normally white mode, the polarizing directions are parallel. The following description will be about the normally black mode.

Figure 2:
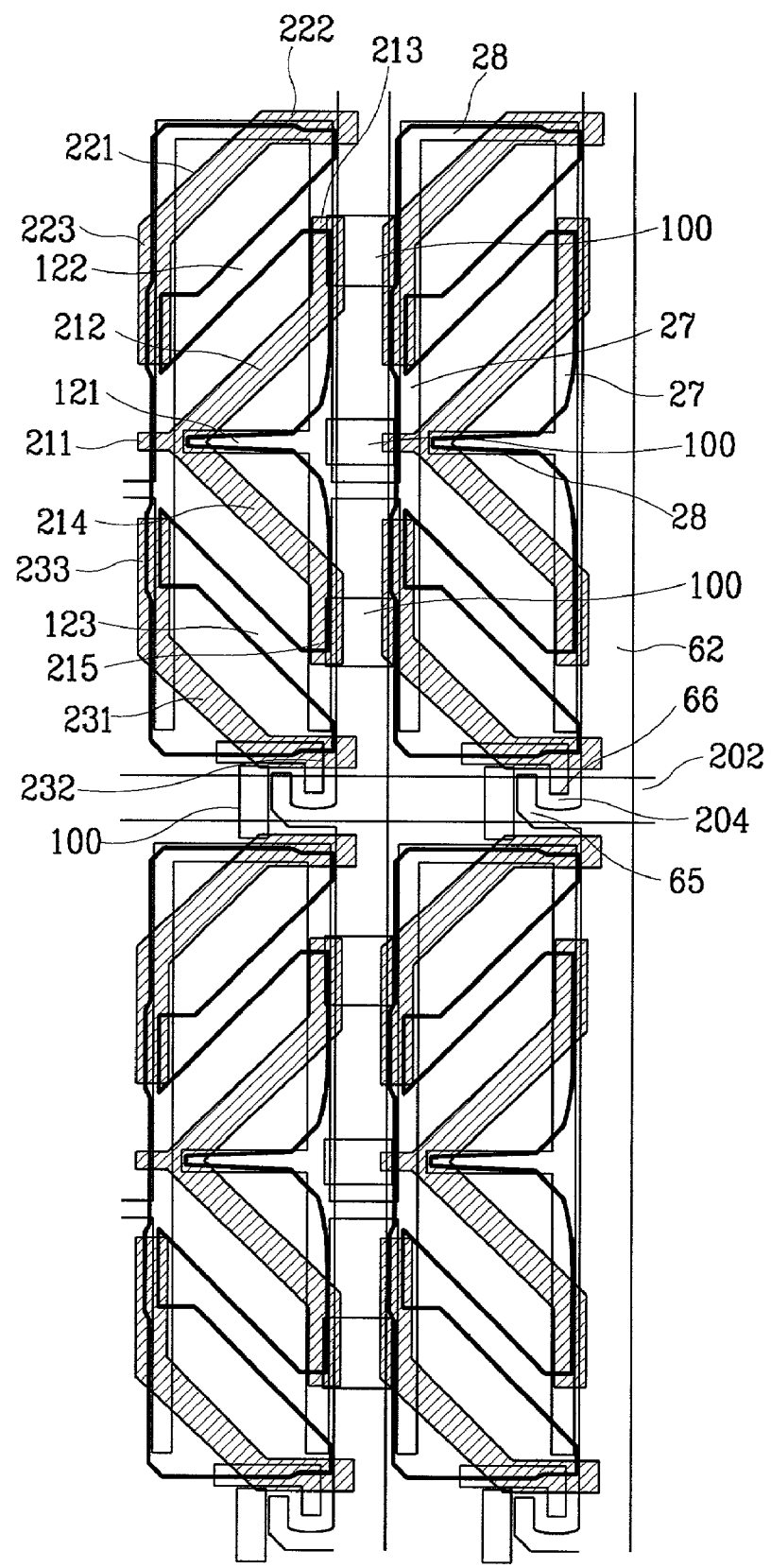
FIGS. 2 and 3 are schematic plan views of an aperture pattern formed on upper and lower substrates of an LCD, and spacers provided between the substrates, according to first and second preferred embodiments, respectively, of the present invention.

FIG. 2 shows a schematic plan view of an aperture pattern formed on first and second substrates, and spacers provided between the substrates, according to a first preferred embodiment of the present invention. The drawing depicts the substrates in a combined state, that is, in a state where the second substrate is provided opposing the first substrate with a predetermined gap therebetween.

Formed on the first substrate is gate wiring, which includes gate lines 202 for transmitting scanning signals and gate signals, and gate electrodes 204 of thin film transistors, which are connected to the gate lines 202. Also formed on the first substrate is data wiring. The data wiring includes data lines 62 intersecting the gate lines 202 to define unit pixels, the data lines 62 transmitting data signals; source electrodes 65 of the thin film transistors, which are connected to the data lines 62; and drain electrodes 66 of the thin film transistors, which oppose the source electrodes 65 centered about the gate electrodes 204. Here, the pixel electrodes 12 and the drain electrodes 66 are electrically connected such that the pixel electrodes 12 receive data signals from the data wiring 62, 65 and 66. Further, storage wiring 27 and 28 is formed on a circumference of the unit pixels, the storage wiring 27 and 28 overlapping the pixel electrodes 12 to form a storage capacitance, and preventing the leakage of light through the edges of the unit pixel.

A first aperture 121 is formed in each pixel electrode 12. The first apertures 121 penetrate through a center portion of the pixel electrodes 12 starting from a right side thereof (in the drawing), and extend almost the entire width of the pixel electrodes 12 to divide the pixel electrodes 12 into an upper half and a lower half. The first apertures 121 are wide where they begin (their "openings") on the right side of the pixel electrodes 12 then taper at two different predetermined angles to a predetermined width, after which the first apertures 121 continue at this width for the remainder of their length Further, second and third apertures 122 and 123 are formed respectively in the upper and lower half of each pixel electrode 12. The second and third apertures 122 and 123 are symmetrical about the first apertures 121, and are formed starting from the right side of the pixel electrodes 12 and extend to a left side (in the drawing) of the same at a predetermined angle. The left sides of the pixel electrodes 12 where the second and third apertures 122 and 123 end are protruded outwardly to prevent connection defects caused by the second and third apertures 122 and 123.

A fourth aperture is formed in each unit pixel of the common electrode 23, which is continuously formed over an entire surface of the second substrate. The fourth aperture includes an apex 211 formed in a horizontal direction (in the drawing), first and second branches 212 and 214 obliquely formed from the apex 211 extending respectively upwardly and downwardly, and first and second branch ends 213 and 215 extending vertically from distal ends of the first and second branches 212 and 214. Further, a fifth aperture is formed above (in the drawing) the fourth apertures. The fifth apertures include a center portion 221 extending from one edge of the unit pixel to an adjacent edge at an angle identical to the first branch 212, a horizontal portion 222 extending in the horizontal direction from the center portion 221, and a vertical portion 223 extending in the vertical direction from the center portion 221. Sixth apertures including center, horizontal and vertical portions 231, 232 and 233 are formed symmetrically with the fifth apertures on the opposite side of the fourth apertures. The fourth, fifth and sixth apertures are formed in the same manner in each unit pixel of the common electrode 23.

As shown in FIG. 2, portions of the first, second and third apertures 121, 122 and 123 of the pixel electrodes 12 overlap portions of the fourth, fifth and sixth apertures of the common electrode 23 to divide the pixel electrode into a plurality of regions. The center portion 221 of the fifth aperture, the second aperture 122, the first branch 212 of the fourth aperture, the second branch 214 of the fourth aperture, the third aperture 123, and the center portion 231 of the sixth aperture are provided in parallel in an alternating manner.

As a result of the above aperture configuration, the liquid crystal molecules, which are re-aligned following the formation of an electric field between the substrates, are slanted in four different directions in each pixel region according to the fringe field formed as a result of the apertures.

Provided at ends of the elements 211, 213, 215, 222, 232 and 233 of the apertures of the common electrode 23 are spacers 100. The spacers are made of an organic material and act to maintain a uniform gap between the substrates. With this configuration, directors of the liquid crystal molecules at ends of the elements 211, 213, 215, 222, 232 and 233 of the apertures are not aligned in various directions preventing disclination. That is, when a drive voltage is applied to the pixel electrodes 12 and the common electrode 23 to control the liquid crystal molecules, the electric field at ends of the elements 211, 213, 215, 222, 232 and 233 is not uniformly formed and a slanting of the electric field significantly varies. This causes the non-uniform alignment of the liquid crystal molecules. By providing the organic spacers 100 at these locations, disclination is prevented. In addition, the spacers 100 are able to securely maintain the gap between the substrates even when outside shocks are applied to the LCD, in which prevents brightness reduction caused by changes in the gap.

The above aperture patterns can take various shapes to dividedly align the liquid crystal molecules. However, it is preferable that the following conditions be satisfied.

(i) It is preferable that a single pixel region is divided into four in order to realize a wide viewing angle.

(ii) In order to realize a stable divided alignment of the liquid crystal molecules, neither disclination nor texture should occur outside the borders of the divided small regions. With disclination, the directors of the liquid crystal molecules may assume various directions rather than a uniform direction in a small region. Hence, the liquid crystals are slanted so that they contact one another in a single pixel region. It is therefore preferable that the patterns of the first and second substrates are repeated to realize a stable divided alignment, and that the patterns of the first and second substrates are formed as close together as possible. Stated differently, when viewing the apertures in a combined state from above (top sectional view), it is preferable that the regions formed by the patterns of the first and second substrates assume closed polygonal shapes. Further, since disclination can easily occur if an acute angle is formed in the patterns to define one region, it is preferable that only obtuse angles be formed in the patterns. A stable divided alignment is also necessary to obtain good brightness characteristics. In a region with a scattered alignment, light appears brighter in an off state and some portions are darker than other portions result in an on state. The scattered alignment regions change location during liquid crystal molecule alignment and generate afterimages.

(iii) This following condition must be satisfied in order to obtain a high brightness. First, it is preferable that the liquid crystal directors of adjacent regions meet each other at 90 degree angle. By meeting this criterion, disclination occurs only at the narrowest region. Also, an angle between a transmission axis of the polarizing plate and the liquid crystal directors is 45 degrees can achieve the highest brightness. Further, it is preferable that bending or angling of the angles made by the apertures of the first and second substrates be reduced as much as possible.

(iv) To obtain a good response speed, the above condition to better obtain brightness by minimizing bending or angling of the angles made by the apertures of the first and second substrates must be satisfied.

Figure 3:
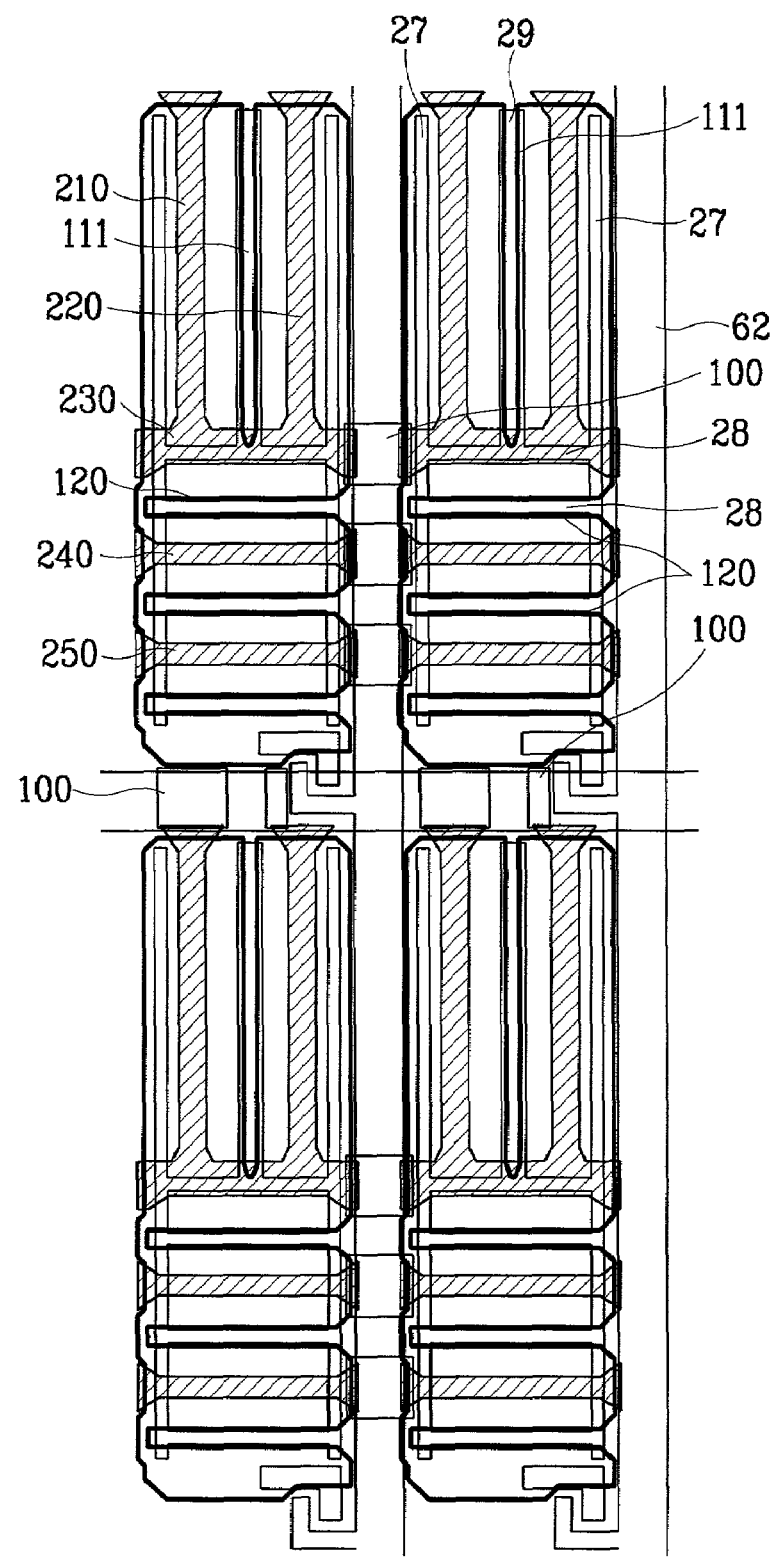

FIG. 3 shows a schematic plan view of an aperture pattern formed on first and second substrates, and spacers provided between the substrates, according to a second preferred embodiment of the present invention. The drawing depicts the substrates in a combined state, that is, in a state where the second substrate is provided opposing the first substrate with a predetermined gap therebetween.

Storage wiring 27, 28 and 29 occupies edges of unit pixels and is formed corresponding to an aperture pattern of the pixel electrodes 12. The aperture pattern of the pixel electrodes 12 includes a first aperture 111 that divides an upper portion (in the drawing) of the pixel electrodes 12 into left and right (in the drawing) halves, and a second aperture 120 that divides a lower portion (in the drawing) of the pixel electrodes 12 into four portions. Further, a third aperture is formed in the common electrode 23 of each unit pixel. The third aperture includes a horizontal portion 230 formed substantially in a center area of each pixel region to divide the common electrode 23 of a unit pixel into upper and lower portions (in the drawing), and first and second vertical portions 210 and 220 extending from the horizontal portion 230 across the upper portion of the common electrode 23 of a unit pixel. Formed horizontally (in the drawing) in the lower portion of the common electrode 23 of a unit pixel are fourth and fifth apertures 240 and 250. Unconnected ends of the elements 210, 220, 230, 240 and 250 expand into triangular shapes.

As shown in FIG. 3, the first aperture 111 of the pixel electrodes 12 and the first and second vertical portions 210 and 220 of the common electrode 23 in each unit pixel are alternatingly formed in parallel such that the upper portions of the pixel electrodes 12 are divided into four substantially equal vertical regions. Further, the second apertures 120, the horizontal portion 230 of the third aperture, the fourth aperture 240, and the fifth aperture 250 are alternatingly formed in parallel in a horizontal direction starting from the center of the pixel regions and extending downward to the lower portion of the pixel regions. Accordingly, the pixel electrodes 12 are divided into six substantially equal regions.

In addition, provided at ends of the elements 210, 220, 230, 240 and 250 of the apertures of the common electrode 23 are spacers 100. The spacers 100 are made of an organic material, act to maintain a uniform gap between the substrates, and otherwise provide the same benefits as outlined with respect to the first preferred embodiment.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, although aperture patterns are formed in the common electrode and the pixel electrodes in the above embodiments, it is possible to form both an aperture pattern and protrusions only in the pixel electrodes. In this case, the protrusions can be formed, for example, out of the gate insulating layer or the protection layer. When protrusions are formed, care must be taken to prevent the parasitic capacitance in the spaces between the wiring. As another example, an aperture pattern may be formed in the pixel electrodes and protrusions in the common electrode.

What is claimed is:

1. A liquid crystal display, comprising:
a first substrate;
a pixel electrode formed on the first substrate and having a main surface,
a first aperture pattern extending in the main surface of the pixel electrode, wherein the first aperture pattern includes a first aperture formed in a first direction in an upper region of the pixel electrode, and
a second aperture formed in a lower region of the pixel electrode in a second direction, which forms a substantially right angle with the first direction;
a second substrate facing the first substrate;
a common electrode formed on the second substrate and having a main surface facing the main surface of the pixel electrode;
a second aperture pattern extending in the main surface of the common electrode and having a portion extending substantially straight along the main surface of the common electrode and substantially in parallel with the first aperture pattern, wherein the second aperture pattern includes a first base aperture formed in the first direction at a position corresponding to the upper region of the pixel electrode, and a second base aperture formed in the second direction at a position corresponding to the lower region of the pixel electrode;
a pixel region formed between the first substrate and the second substrate, wherein the first aperture pattern and the second aperture pattern divide the pixel region into a plurality of domains;
liquid crystal disposed between the first substrate and the second substrate; and
a spacer provided between the first substrate and the second substrate for maintaining a predetermined gap therebetween and positioned on the main surface of the common electrode at an end portion of the second aperture pattern.

2. The liquid crystal display of claim 1, wherein the first direction forms an oblique angle with edges of the pixel electrode.

3. The liquid crystal display of claim 2,
wherein the second aperture pattern includes a first branch aperture that overlaps upper and lower edges of the pixel electrode, and a second branch aperture that overlaps left and right edges of the pixel electrode,
wherein the first aperture pattern includes third apertures positioned at upper and lower center portions of the pixel electrode, and which are uniformly provided with respect to the upper and lower edges of the pixel electrode, and
wherein the first and second aperture patterns divide the pixel electrode into a plurality of closed polygonal shapes.

4. The liquid crystal display of claim 3, wherein the second branch aperture is wider than the base apertures.

5. The liquid crystal display of claim 1, wherein the first direction is formed uniformly with one edge of the pixel electrode.

6. A liquid crystal display, comprising:
a first substrate;
a pixel electrode formed on the first substrate and having a first aperture pattern;
a second substrate provided opposing the first substrate;
a common electrode formed on the second substrate and having a second aperture pattern;
liquid crystal disposed between the first substrate and the second substrate; and
spacers provided between the first substrate and the second substrate for maintaining a predetermined gap between the first substrate and the second substrate,
wherein the first aperture pattern includes a first aperture formed horizontally from a first side of the pixel electrode, and second and third apertures formed obliquely from the first aperture and symmetrically about the first aperture, and formed such that an interval between the second aperture and the third aperture decreases as approaching a second side of the pixel electrode, which is opposite the first side,
wherein the second aperture pattern includes (a) a base portion formed horizontally, (b) a fourth aperture having first and second branches formed obliquely from the base portion such that a distance between the first and second branches increases in a direction away from the base portion, and having first and second branch ends formed vertically in opposite directions from distal ends respectively of the first and second branches, (c) a fifth aperture having a first center portion formed substantially in parallel with the first branch, and having first and second bends forming horizontal and vertical portions, and (d) a sixth aperture formed symmetrically with the fifth aperture about the fourth aperture, wherein the first and second aperture patterns are formed alternately when the liquid crystal display is viewed from above, and the spacers are provided at ends of the second aperture pattern.

7. A liquid crystal display, comprising:
a first substrate:
a pixel electrode formed on the first substrate and having a first aperture pattern;
a second substrate provided opposing the first substrate;
a common electrode formed on the second substrate and having a second aperture pattern; and
liquid crystal disposed between the first substrate and the second substrate;
wherein the first aperture pattern includes first apertures dividing an upper portion of the pixel electrode into vertical regions, and second apertures formed below the first apertures to divide a lower portion of the pixel electrode into horizontal regions, wherein the second aperture pattern includes third apertures formed vertically, and fourth apertures farmed horizontally below the third apertures, and wherein the first apertures and the third apertures are alternately formed to divide the upper portion of the pixel electrode into a plurality of regions, and the second apertures and fourth apertures are alternately formed to divide the lower portion of the pixel electrode into a plurality of regions.

* * * * *